(12) United States Patent
Nomoto (10) Patent No.: US 8,394,554 B2
(45) Date of Patent: Mar. 12, 2013

(54) SEPARATOR SUCTION DEVICE FOR A FUEL CELL

(75) Inventor: Shigemitsu Nomoto, Okazaki (JP)

(73) Assignee: Toyota Jidosha Kabushiki Kaisha, Toyota-shi (JP)

( * ) Notice: Subject to any disclaimer, the term of this patent is extended or adjusted under 35 U.S.C. 154(b) by 467 days.

(21) Appl. No.: 12/445,534

(22) PCT Filed: Oct. 18, 2007

(86) PCT No.: PCT/JP2007/070756
§ 371 (c)(1),
(2), (4) Date: Apr. 14, 2009

(87) PCT Pub. No.: WO2008/050811
PCT Pub. Date: May 2, 2008

(65) Prior Publication Data
US 2010/0099004 A1    Apr. 22, 2010

(30) Foreign Application Priority Data
Oct. 26, 2006  (JP) ................. 2006-290781

(51) Int. Cl.
*H01M 8/04*  (2006.01)
*H01M 4/82*  (2006.01)
*H01M 8/00*  (2006.01)

(52) U.S. Cl. ........ 429/512; 429/514; 429/400; 429/535; 29/623.1; 29/623.2

(58) Field of Classification Search .......... None
See application file for complete search history.

(56) References Cited

U.S. PATENT DOCUMENTS

| | | | |
|---|---|---|---|
| 4,824,739 A * | 4/1989 | Breault et al. | 429/469 |
| 6,569,372 B1 * | 5/2003 | Saito et al. | 264/325 |
| 7,011,004 B2 * | 3/2006 | Ishii et al. | 83/24 |

FOREIGN PATENT DOCUMENTS

| | | |
|---|---|---|
| JP | 2002-370245 A | 12/2002 |
| JP | 2003-022817 A | 1/2003 |
| JP | 2003-022820 A | 1/2003 |
| JP | 2003-022827 A | 1/2003 |

(Continued)

OTHER PUBLICATIONS

Office Action issued Oct. 27, 2011 in German Patent Application No. 11 2007 002 542.5 and English translation thereof.

*Primary Examiner* — Maria J Laios
*Assistant Examiner* — Jennifer Rea
(74) *Attorney, Agent, or Firm* — Kenyon & Kenyon LLP (57) ABSTRACT

A separator suction device for a fuel cell, having a suction plate and a suction pump. A fuel cell separator is placed on the suction plate. The fuel cell separator has flow paths formed as grooves and ridges on one side of thereof and also has a gasket that is a seal member placed around the flow paths. The suction plate attracts the fuel cell separator by suction. The suction pump sucks the fuel cell separator through suction openings formed in the suction plate. The suction plate has a suction groove which receives the gasket and which has a suction opening formed in it. Further, the suction plate preferably has the suction openings at positions where the ridges of the fuel cell separator are to be placed and is made of an elastic material.

9 Claims, 6 Drawing Sheets

FOREIGN PATENT DOCUMENTS

| | | |
|---|---|---|
| JP | 2005-149847 A | 6/2005 |
| JP | 2006-012529 A | 1/2006 |
| JP | 2006-173058 A | 6/2006 |
| JP | 2006-294314 | 10/2006 |

* cited by examiner

SEPARATOR SUCTION DEVICE FOR A FUEL CELL

This is a 371 national phase application of PCT/JP2007/070756 filed 18 Oct. 2007, claiming priority to Japanese Patent Application No. JP 2006-290781 filed 26 Oct. 2006, the contents of which are incorporated herein by reference.

TECHNICAL FIELD

The present invention relates to a separator suction device for a fuel cell, and particularly to a separator suction device for a fuel cell which sucks a cell separator having flow paths formed as grooves and ridges on one side thereof, and having a seal member provided around the flow paths.

BACKGROUND ART

Fuel cells have received attention in recent years as batteries with high efficiency and excellent environmental properties. Fuel cells generally generate electrical energy as a result of a chemical reaction between hydrogen, which is fuel gas, and oxygen in the air, which is oxidation gas. Types of fuel cells include phosphoric acid fuel cells, molten carbonate fuel cells, solid state electrolyte fuel cells, alkaline fuel cells, solid state polymer fuel cells, and so on. Among these types of fuel cells, solid state polymer fuel cells having an advantage that the fuel cell can start at room temperature with high-speed starting and so on are attracting particular attention.

A single cell used in a solid state polymer fuel cell includes an electrolyte membrane, a catalyst layer, a gas diffusion layer, and a separator. An assembly in which an electrolyte membrane, a catalyst layer, and a gas diffusion layer are integrated is generally referred to as a membrane electrode assembly (MEA).

Surface treatment processing such as plasma treatment, primer coating, adhesive coating, and so on is generally applied to a surface of a fuel cell separator forming the single cell. JP 2003-22817 A, for example, describes a method of applying a sealing material to a separator which is placed on a sealing material coating station while sucking the separator with negative pressure which is generated when compressed air is generated.

Figure 5:
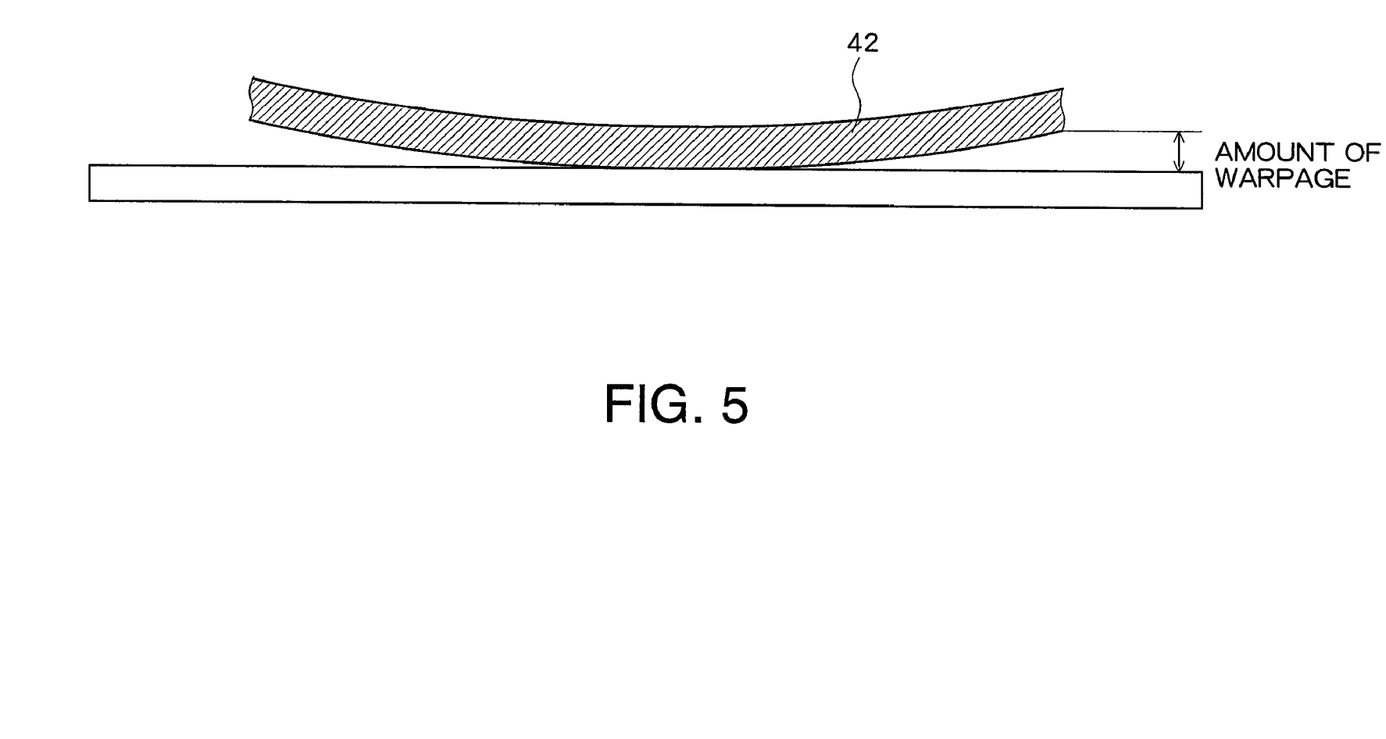
FIG. 5 is a view illustrating a fuel cell separator in which warpage is generated.

Here, a fuel cell separator, e.g. a metal separator formed of titanium and so on, may have local warpage or waviness. FIG. 5 illustrates a fuel cell separator 42 which has been warped. As shown in FIG. 5, the warpage of the fuel cell separator 42 generally increases at end portions of the fuel cell separator 42. The amount of warpage of the fuel cell separator 42 having a thickness of 0.1 mm, for example, is about 5 mm.

Figure 6:
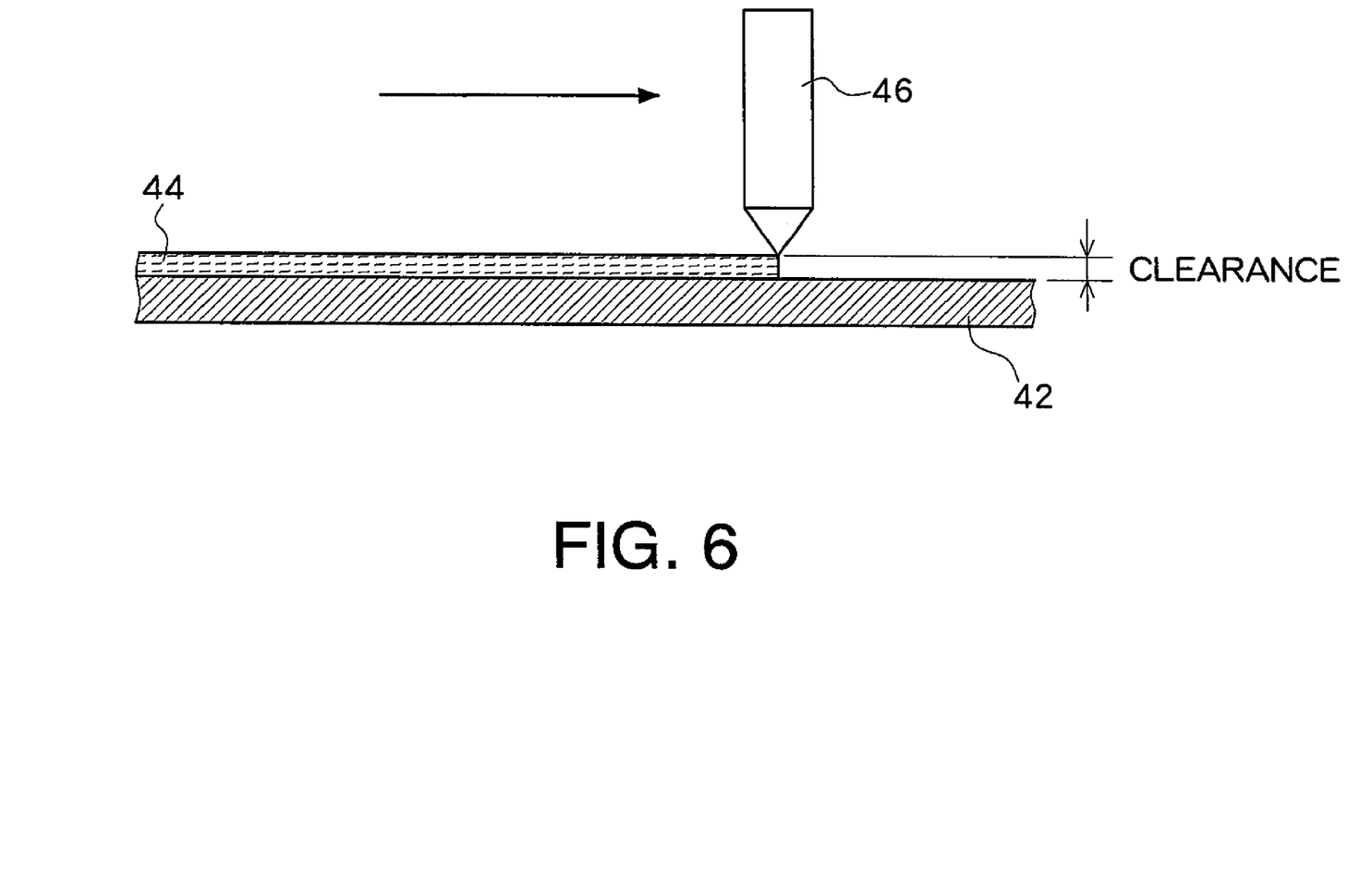

When an adhesive or the like is applied to the surface of the fuel cell separator 42, an adhesive application gun, for example, may be used. FIG. 6 illustrates a method for applying an adhesive 44 onto a surface of the fuel cell separator 42 using an adhesive application gun or the like. Here, in order to keep the adhesive 44 applied on the surface of the fuel cell separator 42 at a substantially constant amount, a clearance between the surface of the fuel cell separator 42 and a nozzle 46 of the adhesion application gun is maintained substantially constant within the range between 0.9 mm or more and 1.2 mm or less, for example.

However, when the fuel cell separator 42 is warped, for example, as shown in FIG. 5, the amount of the adhesive which is applied varies between the substantially center portion and the end portions of the fuel cell separator 42. This may result in a case where the adhesive 44 cannot be applied in a predetermined amount. Further, when an adhesive is applied to the fuel separator by using the sealing material application method described in JP 2003-22817 A as described above, as a negative pressure is generated by ejection of compressed air, it may be difficult to correct a fuel cell separator which is warped.

It is therefore an advantage of the present invention to provide a separator suction device for a fuel cell, capable of correcting warpage or the like of a fuel cell separator in a simple manner, and holding the fuel cell separator.

DISCLOSURE OF THE INVENTION

A separator suction device for a fuel cell according to the present invention includes a suction section that attracts, by suction, a fuel cell separator having a flow path formed on one surface thereof as a groove and a ridge and a seal member provided around the flow path, the fuel cell separator being placed on the suction section, and a suction device that sucks the fuel cell separator through a suction opening provided in the suction section, wherein the suction section includes a suction groove for receiving the seal member, the suction groove having a suction opening formed therein.

In the separator suction device for a fuel cell according to the present invention, in the suction section, a suction opening is provided at a position corresponding to a position of a ridge portion of the fuel cell separator.

In the separator suction device for a fuel cell according to the present invention, the suction section is formed of an elastic member.

As described above, according to the separator suction device for a fuel cell of the present invention, it is possible to correct warpage or the like of the fuel cell separator in a simple manner and hold the fuel cell separator, by sucking the fuel cell separator through the suction openings.

BRIEF DESCRIPTION OF THE DRAWINGS

These and other objects of the invention will be explained in the description below, in connection with the accompanying drawings, in which:

FIG. 6 is a view illustrating a method of applying an adhesive onto a surface of a fuel cell separator using an adhesive application gun and the like.

BEST MODE FOR CARRYING OUT THE INVENTION

Figure 1:
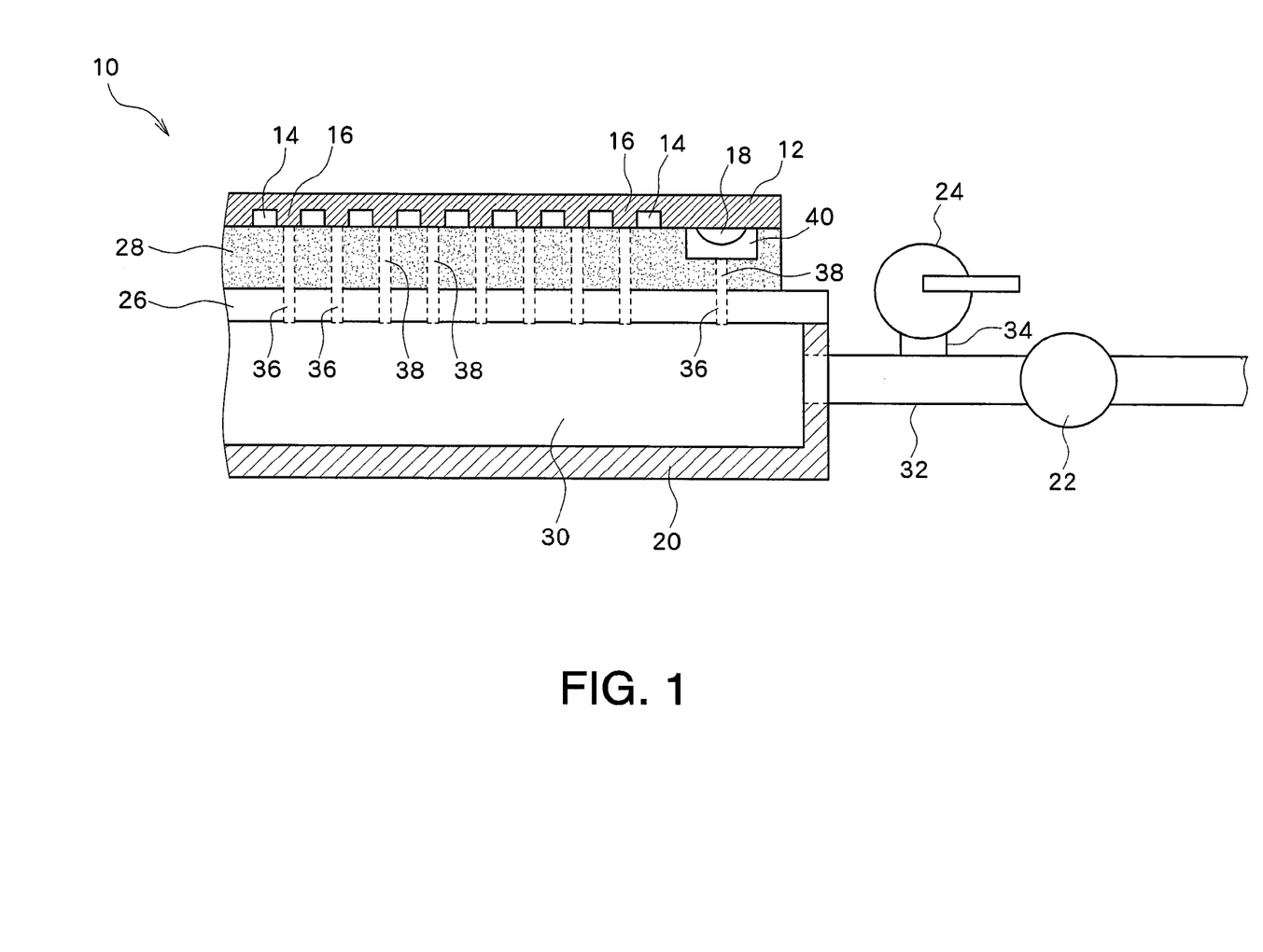
FIG. 1 is a view illustrating a structure of a separator suction device for a fuel cell according to an embodiment of the present invention.

An embodiment of the present invention will be described with reference to the drawings. FIG. 1 is a view illustrating a structure of a separator suction device for a fuel cell 10. A fuel cell separator 12 will be described first.

The fuel cell separator 12 has a function of separating fuel gas such as hydrogen gas and oxidant gas such as air between adjacent single cells, a function of electrically connecting the single cells, and so on. A metal separator formed of a metal material such as titanium, stainless steel, and so on, a carbon separator formed of a carbon material, and other separators may be used for the fuel cell separator 12. The metal separator can be manufactured by press forming of a metal sheet, for example. Further, the carbon separator can be manufactured by, for example, injection molding of a resin containing a carbon material which is an electrically conductive material. It is a matter of course that the fuel cell separator 12 is not limited to the metal separator and the carbon separator described above.

Flow paths for the fuel gas such as hydrogen gas, the oxidant gas such as air, or a long life coolant (LLC) can be formed in the shape of grooves and ridges on at least one surface of the fuel cell separator 12. Such flow paths having groove portions 14 and ridge portions 16 can be formed by machining, for example. A gasket 18 or the like, which is a seal member for sealing the fuel gas, the oxidant gas, and so on, can be provided around the unlevel region in which the flow paths for the fuel gas, the oxidant gas, or the LLC are formed. The gasket 18 has a width of 4 mm to 5 mm, for example, and a thickness of 0.6 mm to 0.7 mm, for example. Silicon, polytetrafluoroethylene (PTFE), and so on can be used for the gasket 18.

The separator suction device for a fuel cell 10 will now be described. The separator suction device for a fuel cell 10 includes a housing 20, a suction pump 22, a valve 24, a suction mount 26, and a suction plate 28.

The housing 20 includes a cavity, to which the suction mount 26 can be mounted to thereby form a hollow portion 30. The housing 20 can be manufactured from a metal material such as stainless steel, for example. It is a matter of course that the material of the housing 20 is not limited to a metal material and may be a synthetic resin material and so on.

The suction pump 22 can be connected with the housing 20 via piping 32 and functions as a suction device which attracts the fuel cell separator 12 by suction. By driving the suction pump 22, air or the like in the hollow portion, which is formed by the housing 20 and the suction mount 26, can be sucked through the piping 32. A pump for use in sucking gas such as air can be generally used as the suction pump 22. Here, the suction device is not limited to the suction pump 22, and may be a blower fan and so on. Piping 32 having a larger diameter and a shorter length is preferably used for connecting the suction pump 22 and the housing 20. With the use of the piping 32 having such a shape, a pressure drop at the time of sucking can be reduced.

The valve 24 can be provided on bypass piping 34 which is formed to bypass the piping 32 and has a function of turning suction of the fuel cell separator 12 ON and OFF. By opening or closing the valve 24 while the suction pump 22 is being driven to thereby turn suction of the fuel cell separator 12 ON or OFF, the fuel cell separator 12 can be attached to or detached from the suction plate 28. For example, by closing the valve 24 while the suction pump 22 is being driven, a negative pressure within the hollow portion 30 or the like can be increased so that the fuel cell separator 12 can be attracted to the suction plate 28 by suction. On the other hand, by opening the valve 24 to thereby lower the negative pressure within the hollow portion 30 or the like, the fuel cell separator 12 can be removed from the suction plate 28. A hand valve, an electromagnetic valve, and so on which are generally used can be used as the valve 24.

The suction mount 26 can be mounted on the housing 20, and the suction plate 28 can be placed on the suction mount 26. A seal member such as an O ring is preferably provided on the surface of the suction mount 26 contacting the housing 20 so as to prevent leakage of air from the contact surface at the time of suction. It is a matter of course that the housing 20 and the suction mount 26 can be formed integrally. The suction mount 26 can be manufactured from a metal material such as stainless steel, for example. It is a matter of course that the material of the suction mount 26 is not limited to a metal material and may be a synthetic resin material and so on under other conditions.

The suction mount 26 can include a plurality of suction holes 36 for attracting the fuel cell separator 12 by suction. The sectional shape of the suction hole 36 is not particularly limited, and may be a substantially circular shape or a polygonal shape such as a substantially rectangular shape. The suction holes 36 can be formed by punching a metal plate such as stainless steel plate by machining or the like.

Figure 2:
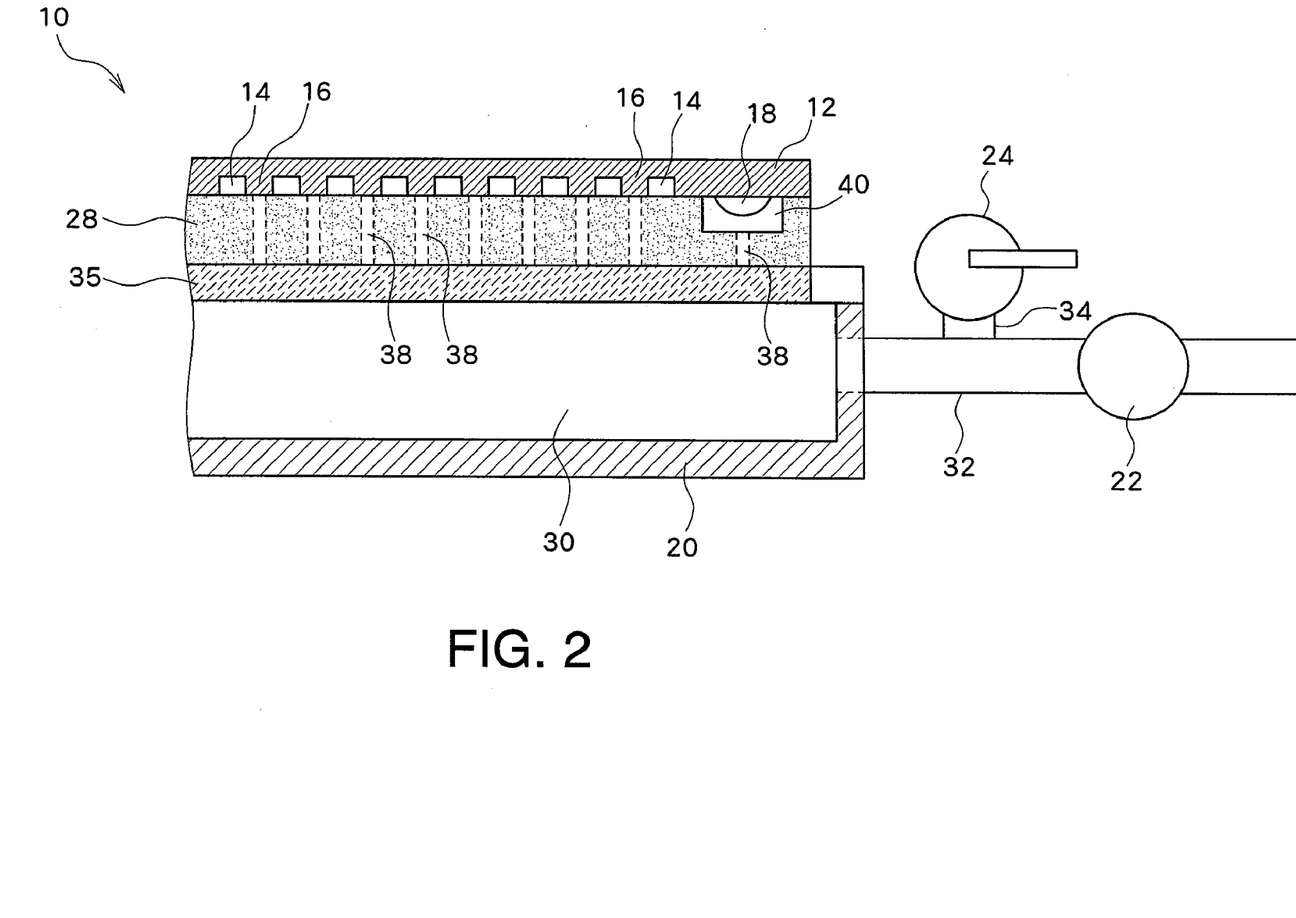
FIG. 2 is a view illustrating a structure of a separator suction device for a fuel cell, in which a porous material is used for a suction mount according to an embodiment of the present invention.

The suction mount 26 can be formed of a porous material or a honeycomb material. FIG. 2 illustrates a structure of a separator suction device for a fuel cell in which a porous material is used for a suction mount 35. With the use of a porous material for the suction mount 35, it is possible to attract the fuel cell separator 12 by suction through a plurality of holes formed in the porous material. A metal porous material, an inorganic porous material, and so on, for example, may be used as the porous material.

Referring back to FIG. 1, the suction plate 28 can be placed on the suction mount 26 and functions as a suction unit which attracts the fuel cell separator 12 by suction. The suction plate 28 may be fixed to the suction mount 26 using an adhesive and so on or fastened to the suction mount 26 by a fastening member such as a bolt. The suction plate 28 can be placed on the suction mount 26 such that a suction opening 38 formed in the suction plate 28 which will be described below and the suction holes 36 formed in the suction mount 26 coincide with each other.

The suction plate 28 includes the suction openings 38 formed corresponding to the ridge portions 16 of the flow paths formed in the shape of grooves and ridges on the fuel cell separator 12. The suction opening 38 can be formed smaller than the width of the ridge portion 16, because, if the suction opening 38 is formed larger than the width of the ridge portion 16, air may leak from the groove portions 14 of the flow paths which are formed in the shape of grooves and ridges on the fuel cell separator 12 to thereby reduce a suction force which attracts the fuel cell separator 12. Further, it is preferable that the suction openings 38 are formed in a plural number along the ridge portions 16, because a plurality of suction openings 38 may allow the fuel cell separator 12 to be attracted to the suction plate 28 more uniformly. The sectional shape of the suction opening 38 is not particularly limited, and may be a substantially circular shape or a polygonal shape such as a substantially rectangular shape.

The suction plate 28 is preferably formed of an elastic member such as a rubber material and so on. By causing the suction plate 28 to elastically deform at the time of suction of the fuel cell separator 12 and reduce the clearance between the suction plate 28 and the fuel cell separator 12, the fuel cell separator 12 can be attached to the suction plate 28 with higher adhesion. Also, by causing the suction plate 28 to elastically deform at the time of suction of the fuel cell separator 12, deformation, damage, and so on of the fuel cell separator 12 can be suppressed. Silicon rubber, for example, can be employed as the rubber material. It is a matter of course that the suction plate 28 is not limited to an elastic body under other conditions. Further, the suction openings 38 can be formed by punching the rubber material or the like by means of a machining process.

The suction plate 28 can include a suction groove 40 which receives a seal member such as the gasket 18 provided around the flow paths of the fuel cell separator 12 and which also has a suction opening 38 formed therein. With the gasket 18 being received within the suction groove 40, deformation, damage, or the like of the gasket 18 at the time of suction of the fuel cell separator 12 can be suppressed. Further, by sucking the gasket 18 as a whole, the portion of the fuel cell separator 12 where the gasket 18 is provided can be attracted in a more uniform manner.

The suction groove 40 can be formed along a gasket 18 line in which the gasket 18 is provided. The suction groove 40 can be formed such that the width and the thickness of the suction groove 40 are greater than those of the gasket 18 so as to contain the gasket 18. When the width of the gasket 18 is 5 mm, for example, the suction groove 40 can be formed to have a width which is greater than 5 mm. When the thickness of the gasket 18 is 0.5 mm, for example, the suction groove 40 can be formed to have a depth which is greater than 0.5 mm. As described above, the side surfaces and the bottom surface of the suction groove 40 are prevented from being in contact with the gasket 18, so that deformation, damage, or the like of the gasket 18 at the time of suction of the fuel cell separator 12 can be suppressed. The sectional shape of the suction groove 40 is not particularly limited and may be a polygonal shape such as a substantially rectangular shape. The suction groove 40 can be formed by machining a rubber material, for example.

The suction opening 38 for attracting the portion of the fuel cell separator 12 where the gasket 18 is provided can be formed in the suction groove 40. Here, it is preferable that a plurality of suction openings 38 are formed in a line along the gasket 18. With a plurality of suction openings 38, the portion of the fuel cell separator 12 where the gasket 18 is provided can be attracted to the suction plate 28 in a more uniform manner. The sectional shape of the suction opening 38 is not particularly limited and may be a substantially circular shape or a polygonal shape such as a substantially rectangular shape.

Figure 3:
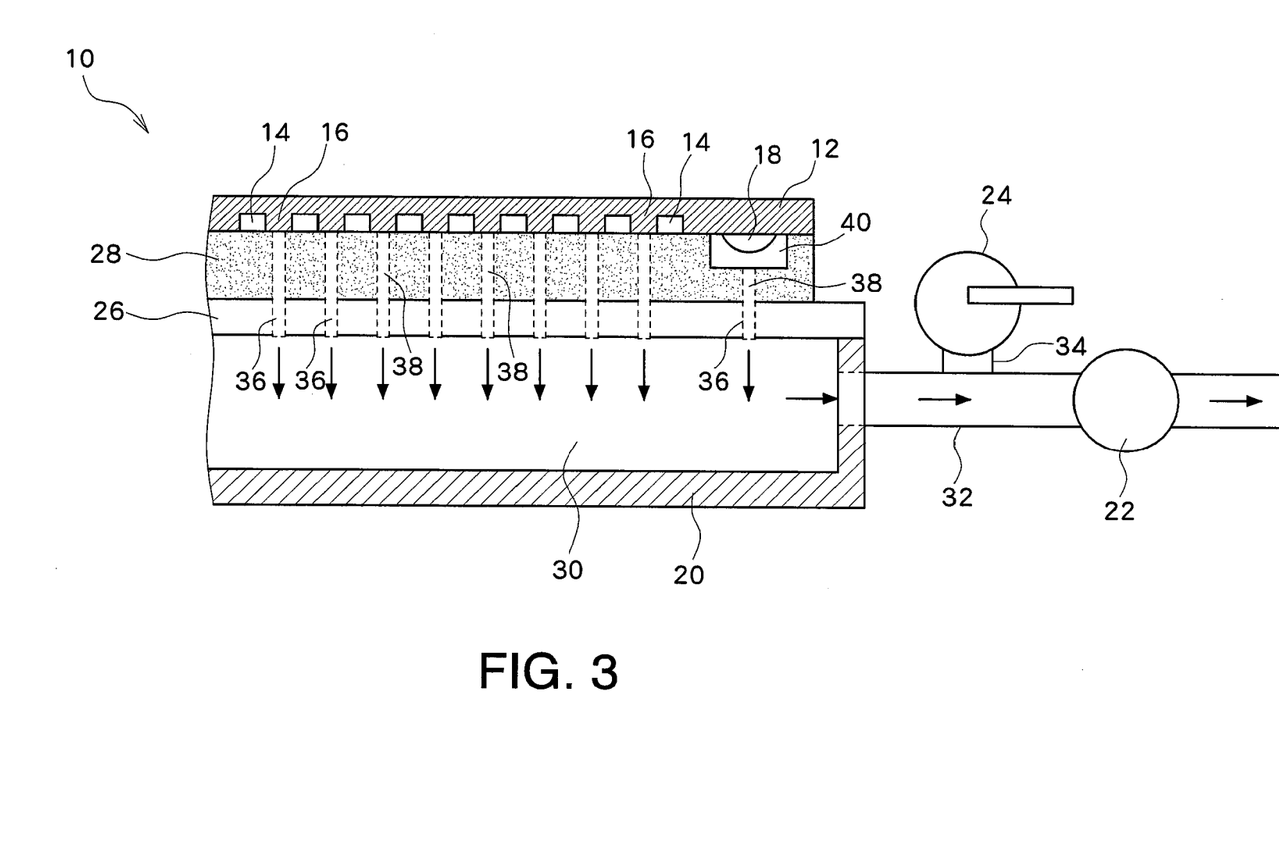
FIG. 3 is a view illustrating an operation of the separator suction device for a fuel cell at the time of sucking the fuel cell separator according to the embodiment of the present invention.

The operation of the separator suction device for a fuel cell 10 will be described. The operation of the separator suction device at the time of attracting the fuel cell separator 12 will first be described. FIG. 3 is a view illustrating the operation of the separator suction device for a fuel cell 10 at the time of attracting the fuel cell separator 12.

The fuel cell separator 12 can be first set with respect to the suction plate 28 such that the positions of the ridges 16 of the fuel cell separator 12 correspond to the positions of the suction openings 38 of the suction plate 28. Further, the gasket 18 can be received within the suction groove 40 provided in the suction plate 28. Then, by closing the valve 24 after driving the suction pump 22, air can be sucked through the suction openings 38 formed in the suction plate 28 to cause the fuel cell separator 12 to be attracted to the suction plate 28 by suction. Air can be similarly sucked from the suction groove 40 containing the gasket 18 through the suction opening 38, thereby causing the end portion of the fuel cell separator 12 to be attracted to the suction plate 28. As such, with warpage or the like of the fuel cell separator 12 being corrected, the fuel cell separator 12 can be attracted to the suction plate 28 and held by the separator suction device for a fuel cell 10.

By attracting the fuel cell separator 12 by suction, application of an adhesive, primer, and so on can be performed in a state where the fuel cell separator 12 is attached to the suction plate 28. Here, as warpage or the like may be corrected in the fuel cell separator 12 which is attracted to the suction plate 28, it is possible to apply an adhesive or the like to the fuel cell separator 12 more uniformly.

Figure 4:
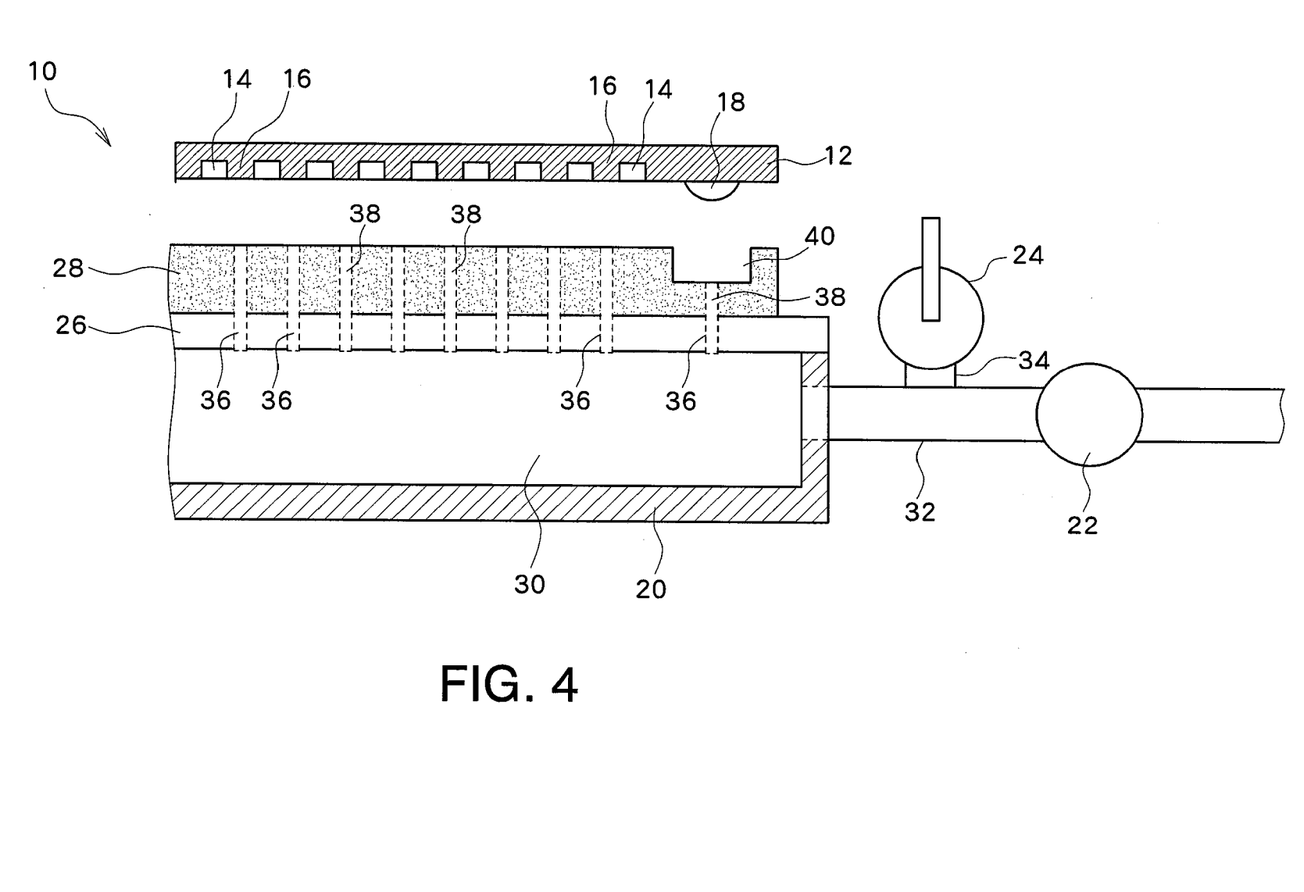
FIG. 4 is a view illustrating an operation of the fuel cell separator suction device at the time of removing the fuel cell separator according to the embodiment of the present invention.

The operation of the separator suction device for a fuel cell at the time of removing the fuel cell separator 12 will now be described. FIG. 4 is a view illustrating the operation of the separator suction device for a fuel cell 10 for removing the fuel cell separator 12. After application of an adhesive or the like is completed, for example, the valve 24 can be opened to terminate suction of air through the suction openings 38 formed in the suction plate 28, so that the suction openings 38 and the hollow portion 30 can be opened to air. This enables the fuel cell separator 12 to be removed from the suction plate 28.

With the structure described above, by sucking the fuel cell separator 12 to attract the fuel cell separator 12 to the suction plate by suction, it is possible to easily correct warpage or the like of the fuel cell separator 12 and hold the fuel cell separator 12. As a result, when an adhesive or the like, for example, is applied to the fuel cell separator 12, as the warpage of the fuel cell separator 12 may be corrected, the thickness of the adhesive application layer can be made more uniform.

With the structure described above, by sucking the fuel cell separator 12 to attract the fuel cell separator 12 to the suction plate by suction, the fuel cell separator 12 can be held while suppressing deformation, damage to the fuel cell separator 12 compared to when the fuel cell separator is held using a weight, an outer frame, and so on. Further, as the process required for attaching and detaching the weight or the outer frame can be eliminated to reduce the number of processes, productivity can be increased.

Also, with the structure described above in which the suction plate includes a suction groove receiving a gasket or the like and having a suction opening formed therein, it is possible to attract end portions of the fuel cell separator which have greater warpage or the like than in the substantially center portion by suction while suppressing deformation, damage to the gasket or the like.

In addition, with the structure described above, as the suction plate may be formed of an elastic member such as a rubber material, the suction plate can deform elastically at the time of attracting the fuel cell separator by suction, so that the fuel cell separator and the suction plate can be adhered to each other more closely to thereby further increase the suction efficiency. Further, because the suction plate can elastically deform at the time of attracting the fuel cell separator by suction, deformation, damage, or the like of the fuel cell separator can be suppressed.

The invention claimed is:

1. A separator suction device for a fuel cell that attracts, by suction, a fuel cell separator including a groove portion, a ridge portion, and a seal member on a first surface of the fuel cell separator, the fuel cell separator being placed on the separator suction device, the separator suction device for a fuel cell comprising:
    a suction section including a plurality of suction openings and a suction groove for receiving the seal member both formed within a suction side of the suction section that faces the first surface of the fuel cell separator, the suction groove having one of the plurality of openings formed therein;

a hollow portion formed on another side of the suction section opposite to the fuel cell separator; and a suction device configured to suck air through the hollow portion and the suction openings so that the first surface of the fuel cell separator is attracted to the suction device, by suction.

2. The separator suction device for a fuel cell according to claim 1, wherein the suction groove forms an indent with respect to a surface of the suction side and the one of the plurality of openings of the suction groove is formed on a bottom surface of the suction groove.

3. The separator suction device for a fuel cell according to claim 1, wherein in the suction section, at least one of the plurality of suction openings is provided at a position where the ridge portion of the fuel cell separator is to be placed.

4. The separator suction device for a fuel cell according to claim 1, wherein the suction section is formed of an elastic member.

5. The separator suction device for a fuel cell according to claim 1, wherein the fuel cell separator is a metal separator.

6. A separator suction device for a fuel cell, that attracts, by suction, a fuel cell separator including a groove portion, a ridge portion, and a seal member on a first surface of the fuel cell separator, the fuel cell separator being placed on the separator suction device, the separator suction device for a fuel cell comprising:

a suction section including a plurality of suction openings and a suction groove for receiving the seal member both formed within a suction side of the suction section that faces the first surface of the fuel cell separator, the suction groove forming an indent with respect to a surface of the suction side and having one of the plurality of openings formed on a bottom surface thereof; and a suction device configured to suck air through the suction openings so that the first surface of the fuel cell separator is attracted to the suction device, by suction.

7. The separator suction device for a fuel cell according to claim 6, wherein in the suction section, at least one of the plurality of suction openings is provided at a position where the ridge portion of the fuel cell separator is to be placed.

8. The separator suction device for a fuel cell according to claim 6, wherein the suction section is formed of an elastic member.

9. The separator suction device for a fuel cell according to claim 6, wherein the fuel cell separator is a metal separator.

* * * * *

UNITED STATES PATENT AND TRADEMARK OFFICE
CERTIFICATE OF CORRECTION

PATENT NO. : 8,394,554 B2  Page 1 of 1
APPLICATION NO. : 12/445534
DATED : March 12, 2013
INVENTOR(S) : Shigemitsu Nomoto It is certified that error appears in the above-identified patent and that said Letters Patent is hereby corrected as shown below:

On the Title Page:

The first or sole Notice should read --

Subject to any disclaimer, the term of this patent is extended or adjusted under 35 U.S.C. 154(b) by 580 days.

Signed and Sealed this

First Day of September, 2015

Michelle K. Lee
*Director of the United States Patent and Trademark Office*